US012718525B2

(12) United States Patent
Michaud

(10) Patent No.: US 12,718,525 B2
(45) Date of Patent: Aug. 25, 2026

(54) CLASSIFICATION AND SAWING OF WOOD SHINGLES USING MACHINE VISION

(71) Applicant: Clair Industrial Development Corporation Ltd., Clair (CA)

(72) Inventor: Pierre Michaud, Clair (CA)

(73) Assignee: CLAIR INDUSTRIAL DEVELOPMENT CORPORATION LTD., Clair (CA)

( * ) Notice: Subject to any disclaimer, the term of this patent is extended or adjusted under 35 U.S.C. 154(b) by 672 days.

(21) Appl. No.: 17/803,842

(22) Filed: Dec. 22, 2022

(65) Prior Publication Data

US 2023/0196730 A1 Jun. 22, 2023

Related U.S. Application Data

(60) Provisional application No. 63/372,718, filed on Mar. 31, 2022, provisional application No. 63/361,404, filed on Dec. 22, 2021.

(51) Int. Cl.
*G06V 10/764* (2022.01)
*B23D 59/00* (2006.01)
(Continued)

(52) U.S. Cl.
CPC ......... *G06V 10/764* (2022.01); *B23D 59/001* (2013.01); *B23D 59/008* (2013.01);
(Continued)

(58) Field of Classification Search
CPC .... G06V 10/764; G06V 10/74; G06V 10/774; G06V 10/987; G06V 20/50; G06V 2201/06; G06V 10/82; B23D 59/001; B23D 59/008; B25J 19/021; G06T 1/0014; G06T 7/001; G06T 7/60; G06T 7/70;
(Continued)

(56) References Cited

U.S. PATENT DOCUMENTS

| | | | |
|---|---|---|---|
| 4,325,421 A | | 4/1982 | Janovick et al. |
| 6,067,766 A | | 5/2000 | Badke |

(Continued)

FOREIGN PATENT DOCUMENTS

| | | | |
|---|---|---|---|
| CA | 3136766 A1 * | 12/2019 | |
| CN | 113160136 | 7/2021 | |
| CN | 113269739 A | 8/2021 | |

*Primary Examiner* — Henok Shiferaw
*Assistant Examiner* — Dion J Satcher
(74) *Attorney, Agent, or Firm* — Norton Rose Fulbright Canada LLP

(57) ABSTRACT

A method of wood shingle classification and sawing using machine vision comprises the steps of taking an image of a wood slab in a wood block and identifying a defect in that slab; comparing an image of this defect to images of confirmed defects in a database of confirmed defects to find a match of the defect in these images. If a match is not found, sawing a shingle from the slab and classifying the shingle while making abstraction of the defect. In a second aspect, when images of two consecutive shingles are identical, a third and subsequent shingles can be sawn from a block without taking images thereof. In another aspect, the comparing of images is done by an artificial intelligence system that is trained on a database of images that are associable to the subjectivity of experienced shingle sawyers.

1 Claim, 11 Drawing Sheets

(51) Int. Cl.

| | |
|---|---|
| ***B25J 19/02*** | (2006.01) |
| ***G06T 1/00*** | (2006.01) |
| ***G06T 7/00*** | (2017.01) |
| ***G06T 7/60*** | (2017.01) |
| ***G06T 7/70*** | (2017.01) |
| ***G06T 7/90*** | (2017.01) |
| ***G06V 10/74*** | (2022.01) |
| ***G06V 10/774*** | (2022.01) |
| ***G06V 10/98*** | (2022.01) |
| ***G06V 20/50*** | (2022.01) |
| *B27B 5/02* | (2006.01) |

(52) U.S. Cl.

CPC ........... *B25J 19/021* (2013.01); *G06T 1/0014* (2013.01); *G06T 7/001* (2013.01); *G06T 7/60* (2013.01); *G06T 7/70* (2017.01); *G06T 7/90* (2017.01); *G06V 10/74* (2022.01); *G06V 10/774* (2022.01); *G06V 10/987* (2022.01); *G06V 20/50* (2022.01); *B27B 5/02* (2013.01); *G06T 2207/20081* (2013.01); *G06T 2207/30161* (2013.01); *G06V 2201/06* (2022.01)

(58) Field of Classification Search

CPC ............. G06T 7/90; G06T 2207/20081; G06T 2207/30161; G06T 2207/20084; G06T 7/0004; B27B 5/02

USPC .......................................................... 382/141

See application file for complete search history.

(56) References Cited

U.S. PATENT DOCUMENTS

| | | | | |
|---|---|---|---|---|
| 7,369,685 | B2 * | 5/2008 | DeLean | G06V 10/757 382/209 |
| 7,844,100 | B2 * | 11/2010 | Auerbach | G06T 7/0004 382/150 |
| 8,113,098 | B1 * | 2/2012 | Longfellow | B27B 31/06 83/72 |
| 10,825,164 | B1 * | 11/2020 | Bolton | G06T 7/001 |
| 10,968,648 | B2 | 4/2021 | Michaud | |
| 11,364,589 | B2 * | 6/2022 | Roy | B27G 1/00 |
| 2016/0307133 | A1 * | 10/2016 | Kour | G06Q 10/06313 |
| 2019/0099886 | A1 * | 4/2019 | Chattopadhyay | G05B 23/024 |
| 2019/0304026 | A1 * | 10/2019 | Lyman | G06N 20/00 |
| 2020/0294222 | A1 * | 9/2020 | Wen | G06T 7/11 |
| 2020/0399916 | A1 | 12/2020 | Michaud | |

* cited by examiner (Subroutine 2)

FIG. 9 (Main Algorithm)

64

1
Scanner Output
17
When defect is non-migrating, use previous scan x times
2
Detect a Defect
3
Compare defect with defect images using A-I Neural Network #1 and classify defect
Initial database of 800,000 defect images
4
Human-Subjectivity Port
5
6
no
?
>75% Matching
yes
ignore defect
Compare defect to previous scan, using A-I Neural Network # 2
12

CLASSIFICATION AND SAWING OF WOOD SHINGLES USING MACHINE VISION

The present application claims the benefit of U.S. Provisional Application No. 63/361,404, filed Dec. 22, 2021, and U.S. Provisional Application No. 63/372,718, filed Mar. 31, 2022; the content of which are incorporated herein by reference.

FIELD OF THE PRESENT INVENTION

The present invention pertains to the field of shingle manufacturing, and more particularly it pertains to shingle classification and sawing using machine vision.

BACKGROUND OF THE PRESENT INVENTION

The computer-assisted shingle sawing installation or machine referenced herein is described in U.S. Pat. No. 10,968,648, the content of which is incorporated herein by reference. The "computer-assisted shingle sawing installation or machine" mentioned above is referred to herein after as the "new shingle machine", for convenience. Portions of this patent are incorporated herein to ensure the completeness of the present specification.

The shingle sawing profession is perhaps the most demanding one in the field of forest industries. Besides the danger and monotony of the manual sawing of shingles, a larger challenge is in the classification of shingles. A clever and skilled sawyer needs a long apprenticeship to do classification of shingles. Such combination is difficult to incorporate into a computer to do classification by machine vision. The grade selection standard for wood shingle requires visual acuity, a subjective interpretation of dozens of quality criteria, and a keen decision-making ability that is difficult to match by a computer. It will be appreciated that the grade-selection standards for wood shingles has not been written for interpretation by a computer.

Shingle classification is done in Canada according to the well-known CSA Standard entitled: CAN/CSA 0118.2-94 (0118.2M-94) Eastern White Cedar Shingles. Similar classification standards are known in the USA and are published by CSSB; Cedar Shake and Shingle Bureau, IBC; International Building Code, and IRC; International Residential Code. Shingle grades in the CSA code are simplified as follows:

- "EXTRA-Grade A": has a clear face below and above the clear line;
- "CLEAR, Grade B": tolerates defects above the clear line;
- "SECOND CLEAR, Grade C": tolerates sound knots below the clear line;
- "CLEAR WHITE": tolerates pin knots under the clear line;
- "UTILITY: all natural wood defects are permitted as long as 50% of the surface is solid wood;
- "CULL": all that cannot be classified in any other classifications.

Grades "A" and "B" are traditionally used for outside wall and roof coverings, where grade "A" is installed with a larger exposed surface than grade "B".

Grade "C" and grade "Clear White" shingles are all purposes shingles used on inside walls and decorative partitions, for examples.

Grade "Utility" shingles are used for shimming windows and doors and for levelling floor beams of mobile homes, and other similar shimming uses.

Grade "CULL" shingles are those that contain too many defects or that are too narrow to be used as shim stock.

During classification of a shingle, there are approximately twenty (20) different types of defects to be considered, with variations in each type. Classification is selected from five (5) different shingle grades. It becomes a tremendous task to train a sawyer or to program a computer to consider all the permutations of these 20 types and 5 grades.

It will be appreciated that a major portion of these criteria are determined subjectively. These criteria are not related to 1 and 0 defect determinations, as it is done by a computer. A good shingle sawyer normally does an apprenticeship as a bundle maker for one thousand hours or more to develop skills in learning shingle quality criteria. After this first apprenticeship, the young sawyer works under a close supervision of a senior sawyer for another thousand hours or more. Only then, an apprentice can become an accomplished shingle sawyer.

For all these reasons, basically, past attempts to manufacture wood shingle using robotic machinery and machine vision have enjoyed a limited success. There remains, more than ever, a need in the industry to address computer-assisted shingle sawing and machine vision.

U.S. Pat. No. 8,113,098 issued to J. L. Longfellow on Feb. 14, 2012. This document describes a machine vision system to determine optimal saw cut to maximize the value of shingles. Wood slabs are exposed to a camera, and a computer determines where the defects are. The shingle is then processed through an edger to trim it to remove any undesired defect.

The "new shingle machine" referenced in U.S. Pat. No. 10,968,648, issued to the present inventor on Apr. 6, 2021 has had better success at classifying shingles using machine vision.

During the early testing of the "new shingle machine", classification of shingles remained a subject for improvement. In particular, there are many defects picked up by machine vision that are not actual defects. Some of these "false defects" include, natural colourations such as heart wood for example, and flying objects such as splinters, slivers, wood shavings and sawdust passing in front of the camera, or dust particles adhering to the lens of the camera.

Therefore, it is believed that there is a need in the shingle industry for a machine vision system that can differentiate between real defects and false defects. There is also a need in the shingle manufacturing industry for a machine vision system that is sufficiently reliable to obviate the need for shingle sawyers to memorize the booklet describing the CSA Standard entitled: CAN/CSA 0118.2-94 (0118.2M-94) Eastern White Cedar Shingles.

SUMMARY OF THE PRESENT INVENTION

In the present invention, there is provided a method and system for classifying and sawing wood shingles using machine vision.

In a first aspect, there is provided a method of wood shingle classification by machine vision comprising the steps of:

- taking an image of a slab of wood and identifying a defect in that slab;
- comparing this defect to images of confirmed wood defects in a database of confirmed wood defects to find a match of wood defect in these images;
- if a match is not found, sawing a shingle from the slab; and classifying the shingle while making abstraction of the defect during the step of classifying.

The database of images of confirmed defect is large enough to consider most possibilities of wood defects. Therefore, if a match is not found, there is a very strong possibility that the defect is a false defect. In order to avoid corrupting the database, false defects are not added to images of confirmed defects.

In a second aspect, there is provided a method wood shingle classification and sawing using machine vision comprising the steps of:

- sawing shingles from wood slabs;
- recording a position of a first defect on a first shingle in a first slab;
- sawing the first shingle from the first slab;
- recording a position of a similar second defect on a second shingle in a second slab;
- sawing the second shingle from the second slab;
- analysing the position of the second defect relative to the position of the first defect, and relative to dimensions of the first shingle;
- when the first position is identical to the second position relative to dimensions of the first shingle;
- sawing a third shingle from a third slab without recording a position of a third defect, and
- classifying the first, second and third shingles according to position and characteristics of the first defect in relation to dimensions of the first shingle.

The method described above is referred to as "Skip-a-Scan" method, where consecutive scans are used to predict the quality and classification of subsequent shingles. Skipping a scan represents a saving in production time in a shingle manufacturing process.

In a third aspect, there is provided a "Double-Cut Mode" providing further savings in production time. This method comprises the steps of determining and comparing widths of first and second slabs. When a width of the second slab is an approximation of a width of the first slab, the edging of the shingles on the second and third contiguous slabs is done in a single-pass mode. The sawing of the second and third slabs is done without taking an image of the third slab. The shorter movement of the carriage between the second and third slab represents a substantial saving in production time. The process is repeated by comparing the width of the fourth slab to the width of the second slab; and by comparing the width of the sixth slab to the width of the fourth slab, and so on.

In a fourth aspect, there is provided a single-pass edging mode, whereby shingles in two superimposed wood slabs are edged in a single pass, that is effected without marking a surface of third wood slab contiguous with the second slab. The single-pass edging is done by precisely edging two superimposed shingles and stopping the edging cuts in the next kerf to be made by the main saw to expose the third slab.

In a fifth aspect, there is provided a method of wood shingle classification and sawing using machine vision comprising the steps of:

- taking an image of a defect in a wood slab;
- comparing this image of the defect to images of confirmed wood defects in a database of images of confirmed wood defects to find a match of this image of the defect in these images;
- if a match is found, adding the image of the defect into the database of images of confirmed wood defects;
- sawing a shingle from the wood slab, and classifying that shingle according to position and nature of the defect;
- using artificial intelligence in the steps of comparing and classifying, and training said artificial intelligence system on a database of images that are associable to the subjectivity of experienced shingle sawyers.

Using human subjectivity to verify the quality and proper tagging of images is done to improve the quality of images of confirmed defects. This method is a good way to incorporate in the database, the knowledge and mental skills acquired by a shingle sawyer during thousands of hours of apprenticeship and practice. Using human subjectivity is a good way to incorporate the nuances of all the criteria and all the permutations included in the CSA standard booklet on shingle classification.

In a further aspect, there is provided a "Clear-or-Better Approach" to shingle classification. This method is carried out as follows:

- taking an image of a shingle and determining a clear line on that shingle;
- identifying a defect in the image;
- if the defect is located above the clear line, classifying that shingle as a Clear-or-Better shingle, and
- if the defect is located below the clear line, classifying the shingle as a Utility shingle.

In yet another aspect of the present invention, there is provided a machine vision system for manufacturing wood shingles, comprising:

- a computer;
- a camera connected to that computer;
- a database of images of wood defects connected to or integrated in the computer; the database being configured for receiving images from the camera; and
- a defect discrimination algorithm incorporated in the computer; this algorithm being configured for managing images in the database and for preventing images of false defects from being added to the database.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the classification and sawing of shingles using machine vision according to the present invention is described with the aid of the accompanying drawings, in which like numerals denote like parts throughout the several views:

FIG. 14 is an enlarged view of the display screen shown in circle 14 in FIG. 13;

DETAILED DESCRIPTION OF THE PREFERRED EMBODIMENT

The preferred embodiment of the machine vision system according to the present invention is described herein below with reference to the attached drawings. The drawings presented herein schematic in nature, and should not be scaled.

Many components of the preferred installation were not illustrated to facilitate the understanding of the basic concept of the design and method of the preferred machine vision system. The components that were not illustrated are those for which the nature, mountings and functions would be obvious to the person skilled in the art of machine vision, forestry equipment and machine design.

The installation according to the preferred embodiment for carrying the method of the present invention is also described in term of its operation and the function of its components. The physical dimensions, material types, and manufacturing tolerances of the system are not provided because these details also do not constitute the essence of the present invention and would be considered obvious to the skilled artisan having acquired the knowledge that is actually provided herein. The preferred embodiment of the method of classification of wood shingles will be explained herein below, in terms of steps using the preferred machine vision system.

Figures 1, 2, 3, 4:
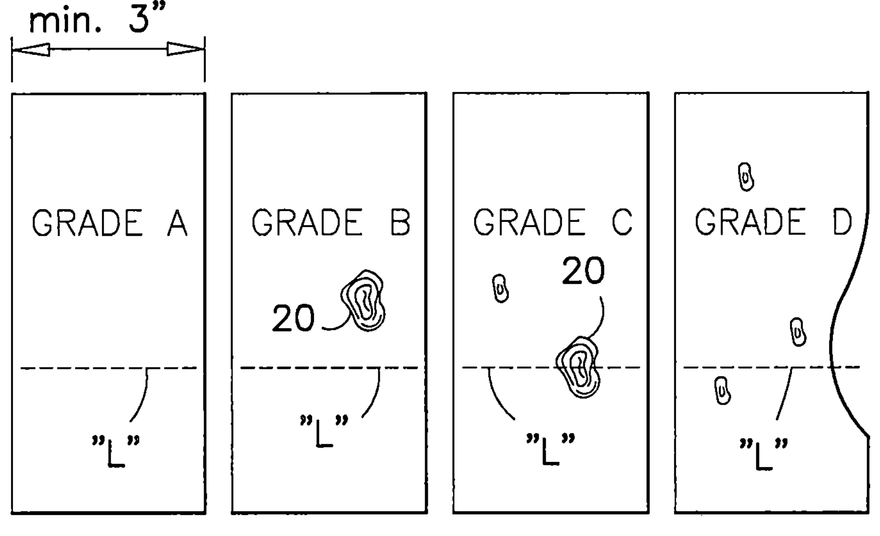
FIG. 1 is a representation of a Grade A shingle.
FIG. 2 is a representation of a Grade B shingle.
FIGS. 3 and 3A are representations of a same shingle being classified as Grade C in FIG. 3 or as Grade B in its mirror image of FIG. 3A.
FIG. 4 is a representation of a Grade D shingle.

For reference purposes, FIG. 1 is a Grade A shingle, clear of any visual defect. Grade A shingles have the greatest market value. A minimum width is 3 inches. The market value increases in proportion to its width.

A Grade B shingle, as in FIG. 2, tolerates a defect above the exposed portion thereof. As can be noted, the defect 20 is located above the line of exposure "L" or the clear line, of the shingle, usually 6 inches (15.2 mm) from the butt.

A Grade C shingle as shown in FIG. 3 has one defect extending below the line of exposure "L".

Optimization-by-Inversion

Figure 3A:
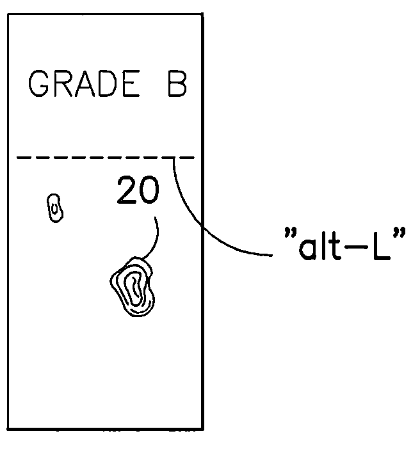

One important aspect of the method according the present invention is that before cutting the shingle shown in FIG. 3, the spur rolls of the "new shingle machine" may adjusted the angle of the cut on the block so that butt of the shingle and the exposed portion of the shingle is on top of the slab, such as shown in FIG. 3A. By doing so, a Grade C shingle became a Grade B shingle, with a much greater market value. This method is referred to herein as "optimization by inversion".

A Grade D shingle, as illustrated in FIG. 4, has too many defects therein, to be used as a shingle product and therefore, it is usually trimmed as window/door shim stock.

Figures 5, 6:
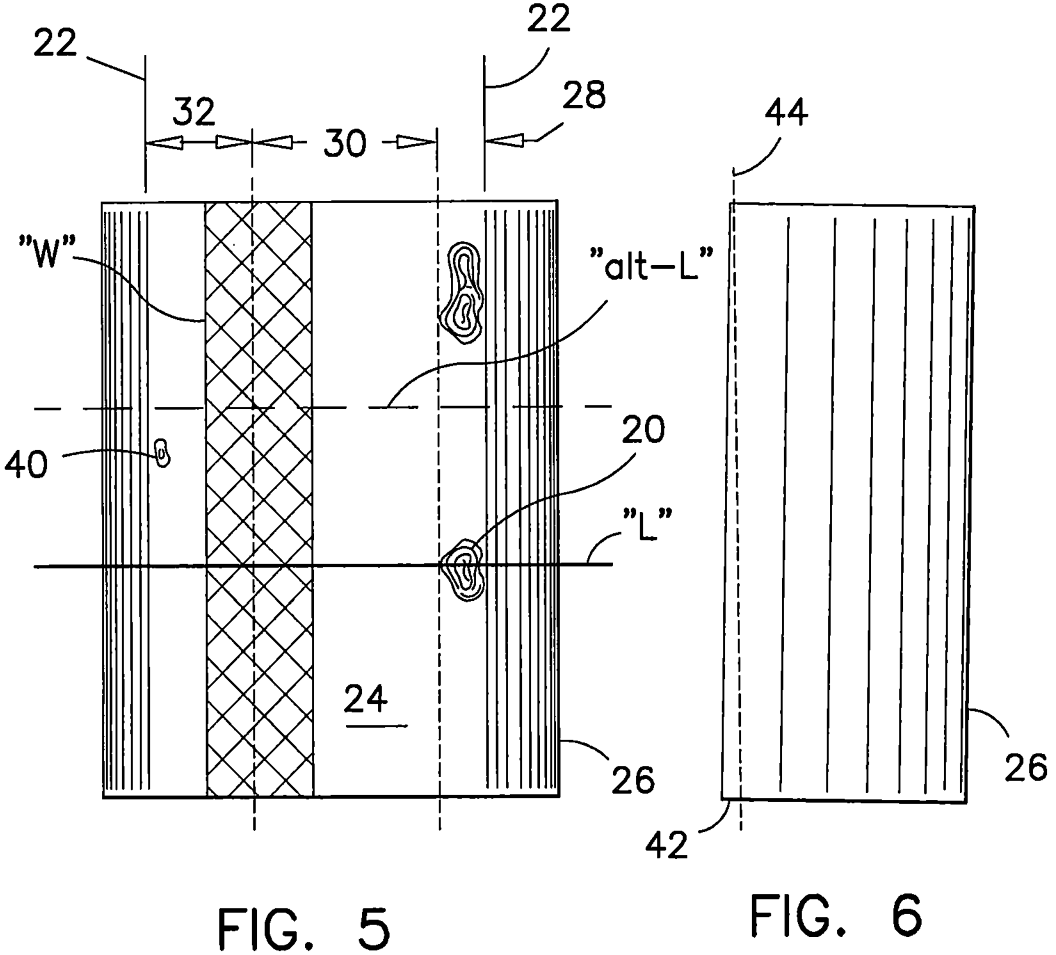
FIG. 5 is an elevation view of a cedar block as seen by the camera of the machine vision system.
FIG. 6 is a side view of the wood block shown in FIG. 5.

Referring now to FIG. 5, both outside lines 22 represent the outside edges (landings or edging lines) of the slab 24 to be cut during the next pass into the main saw of the "new shingle machine".

In the preferred method, the main computer has been programmed to look at the image of the slab 24, and to make 0 or 1 determination of defect(s) in relation of a one-line-one-window algorithm, while ignoring all the criteria of the quality standard referred to before in Grade A and Grade B. The algorithm uses two variables:

1) the visible or line of exposure "L" (or clear line) of the shingles to be taken from the block, and
2) a 3-inch wide-full-length window "W" moving across the slab 24.

The computer analyses the images using the machine vision system and scans the face of the slab, inside the window 'W', for the slightest defect. If a defect is found, irregardless of their size or gravity, they are identified as a positive digit.

When the sweeping window "W" finds a 3-inch wide strip with no defect along the full length thereof, this strip is identified as a minimum-width Grade A shingle.

When the sweeping window "W" finds a 3-inch strip with one or more defects above the clear line and no defect below the clear line "L", that strip is identified as a minimum-width Grade B shingle.

When the sweeping window "W" finds a defect below the clear line "L", a trim line is assigned to each side of the defect, and that strip between the trim lines is identified as a cull strip.

During the sweeping of the window "W" across the face of the slab 24, the total available width of each of GRADE A shingle and GRADE B shingle and the location(s) of cull strips are recorded.

The width of both identified shingle grades is sequentially increased by the computer from the data obtained by the sweeping window "W". The width increase is done according to market value of each grade, to obtain optimum recovery value from each slab 24.

The above analysis is repeated with an alternative clear line "alt-L", and a decision is made according to a better recovery between the first and second analysis whether the butt end of the next slab 24 is on the top or bottom of the block 26.

Once a determination of shingle Grade and width is done, the cedar block 26 is presented to the trimming saw (not shown) and moved back and forth along rails (not shown) so that trimming can be done along the edging lines 22, to define the widths of one or more shingles in that slab 24.

Using the above analysis, the slab 24 shown in FIG. 5 was separated as strip 28 classified as a cull strip, for containing one defect 20 in the visible portion of the shingle, and another one in the covered portion. The remaining portion of the slab 24 was separated into a 5 inches wide Grade A—EXTRA shingle 30 for containing 0 defect over its entire surface; and a 3 inch wide Grade B—CLEAR shingle 32, containing one small defect 40 above the clear line "L" of the shingle.

Referring back to FIG. 6, the wood block 26 is indexed on spur rolls (not shown) of the "new shingle machine". In the "new shingle machine" referenced herein, the wood block 26 can be indexed up to eight consecutive times with the butt end 42 of the shingle in the same end of the block 26. The computer system of the "new shingle machine" has the ability to recognize cases of optimization by inversion as illustrated using FIGS. 3 and 3A, and decides the inclination of the parting line 44 and the location of the butt end 42 of the next shingles, to obtain a best recovery.

This preferred 0-1 defect-one-line-one-window algorithm was introduced to human sawyers. These sawyers were asked to test the method. Cedar blocks were selected randomly, sawn and trimmed according to this preferred simplified method. After careful tabulation of the resulting products, it was found that the yield of Grade A and Grade B shingles from these blocks had increased by 20%, and the resultant quality of packaged shingles in both grades had also increased by 20% as compared to conventional sawing using the conventional quality criteria. The income obtained from these test blocks also increased accordingly. These tests indicate that it is possible to replace the subjectivity of a human sawyer, by 0-1 defect determinations of a computer to manufacture and classify high quality wood shingles.

On the other hand, it is an enormous computer task to analyse the location of a defect relative to the clear line; analyse the size of a defect relative to the shingle width; the type and condition of defect, i.e. a healthy or loose knot, a resin pocket above a 6 inches or 8 inches clear line, etc. During the testing of a machine vision system on the "new shingle machine", it has been found that the removal of defects in cull strips was being effected more often than necessary, resulting in waste.

Eliminating Remediable Defects

Because computers work better with "0" and "1" and "true" or "false" pixel analysis, a classification of shingles by machine vision needs to be formulated accordingly. Defects that are related to "black" and "white" are easy detectable by machine vision, whereas hues and shades are not easily seen. Therefore in the present classification by machine vision, the following steps have been taken initially.

Mechanical Defects

Mechanical defects that can be corrected include: non-parallel edges; length; thickness, width, torn grain and waves. These defects have been eliminated on the "new shingle machine" by using a well-maintained shingle sawing machine with true-running, well-maintained and sharpened saws, and where the size and thickness of each shingle is determined by precise instrumentation.

Therefore, defects related to mechanics mentioned above are no longer an issue with machine vision. Mechanical defects are ignored in a classification by machine vision.

Grain Orientation

Relative to grain orientation, blocks that have been sawn along a plane that is not at least quasi-perpendicular to the axis of the tree from which it came, have not been accepted. This has eliminated grain orientation defects in the finish product. Grain orientation is ignored in a classification by machine vision.

Sapwood

Relative to sapwood, shingle sawing has been done from an inventory of cedar blocks or cedar logs that is managed by good air drying practices such that the sapwood has solidified and blended with its parent adjoining wood material. This has eliminated sapwood defects almost entirely. The remaining sapwood defects are removed at a final manual inspection during packaging. Therefore, there is no requirement to detect sapwood defects by machine vision. Sapwood is ignored in a classification by machine vision.

Overall Wood Quality

Relative to overall wood quality, the "new shingle machine" accepts cedar blocks that have 11 inches or more of diameter on the small end of the block. This has improved shingle quality. These blocks generally are coming from the base of mature trees, where branches are scarce. Knot defects are thereby eliminated to a considerable extent.

Second Clear Sorted Out By Default

Shingles classified as "Grade C—Second Clear" grade becomes less than 2% of the total production. The quantity of "Second Clear" shingles in a shingle production is so small that it does not justify the classification of this grade by machine vision. The "Second Clear" shingles are intermixed with the "Utility Grade" and are easily separated during a final inspection at a manual packaging station. It is easier for shingle bundlers to bundle the "CLASS D—UTILITY" shingles first, because those shingles have the more noticeable defects. The "GRADE C" "Second Clear" are thereby left over and sorted out by default. Therefore, the "second clear" shingles are initially ignored in a classification by machine vision.

Black and White Defects

The remaining defects comprise: knots, decay, checks, cracks, wane, holes, bark and resin pockets. All of these defects are easily detectable by machine vision for being visible as black marks on a light background. In other words, these defects are considered "black" and "white" defects. These defects also have another common attribute that they are not acceptable below the clear line in Grade "A" or Grade "B" shingles.

Reducing the Number of Classifications

Figure 7:
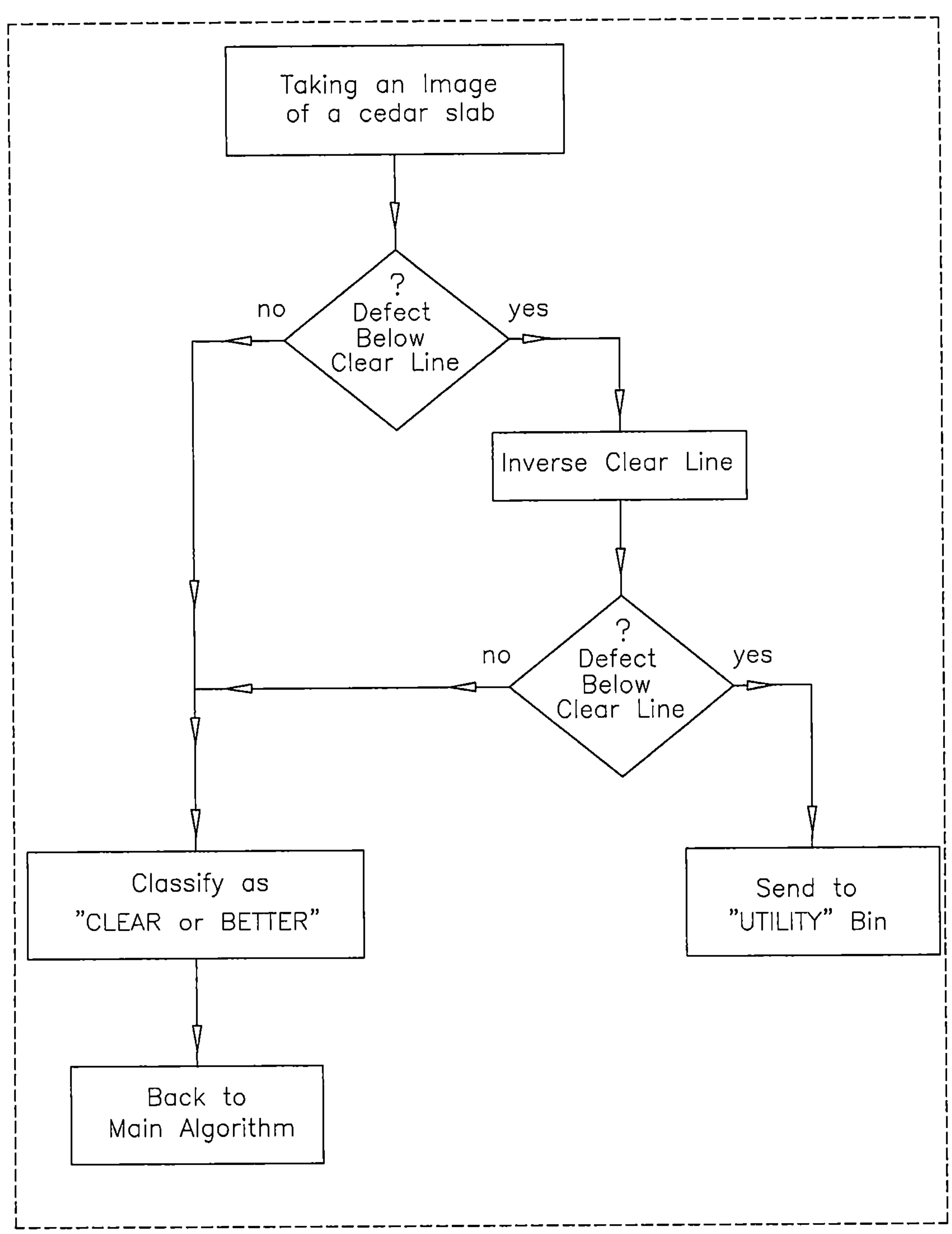
FIG. 7 illustrates a flow diagram of a first algorithm subroutine used for classification by machine vision using the clear-below-the-line approach.

In one of the strategies used, GRADE A has been combined with GRADE B into a new grade which has been entitled as "CLEAR or BETTER". The machine vision system was programmed to look for this single grade only, using a clear-below-the-line approach. All shingles that do not qualify for a "CLEAR or BETTER" grade are discarded as "UTILITY". The "UTILITY" bin contains "UTILITY" grade shingles and "GRADE C" shingles, known as "Second Clear". The quantity of "GRADE C" shingles in a shingle production has been found to be so low that a classification of this grade by machine vision is unjustified. This first algorithm is illustrated in Subroutine 1 in FIG. 7.

It has been found and validated through various tests made with the "new shingle machine", that a classification by machine vision using a shingle grade "CLEAR or BETTER and the "optimization by inversion" process have lead to a reduction of waste, and better recovery of shingle value. It has been found that the method described herein has resulted in a revenue increase of 100% for the same cord of cedar wood, as compared to the traditional method of sawing shingles.

A particular series of tests was done to determine the average content of shingles in a typical production run. Several normal size cedar blocks 26 were sawed. All the shingles obtained from these blocks were classified. Theses tests are summarized in the table below:

TABLE 1

| | GRADE A | GRADE B | GRADE C | UTILITY |
|---|---|---|---|---|
| % of Total | 45.09% | 35.05% | 2.08% | 17.78% |
| Average Width | 5.270" | 5.690" | 4.610" | 4.180" |

Based on these tests, it became clear that a regrouping of the two more valuable classifications into a new "CLEAR or BETTER" classification would comprises at least 81% of a shingle production, with an average shingle width of 5.48 inches. Given the price of sales for the separate grades, and that of a combined grade, it became clear that a "CLEAR or BETTER" classification has merit.

Because of the low percentage of "Grade C"; "Second Clear" in a production run, the grouping of this classification "Grade C"; "Second Clear" with "Utility" also made sense.

As a summary, the present method for classification of shingle by machine vision comprises two steps:

1) Elimination of remediable defects, to remain with "black" and "white" defects below the clear line;
2) Grouping of traditional classifications to remain with only two classifications. What is not "CLEAR or BETTER" is discarded as "Utility".

Shingle Thicknesses

Figure 8:
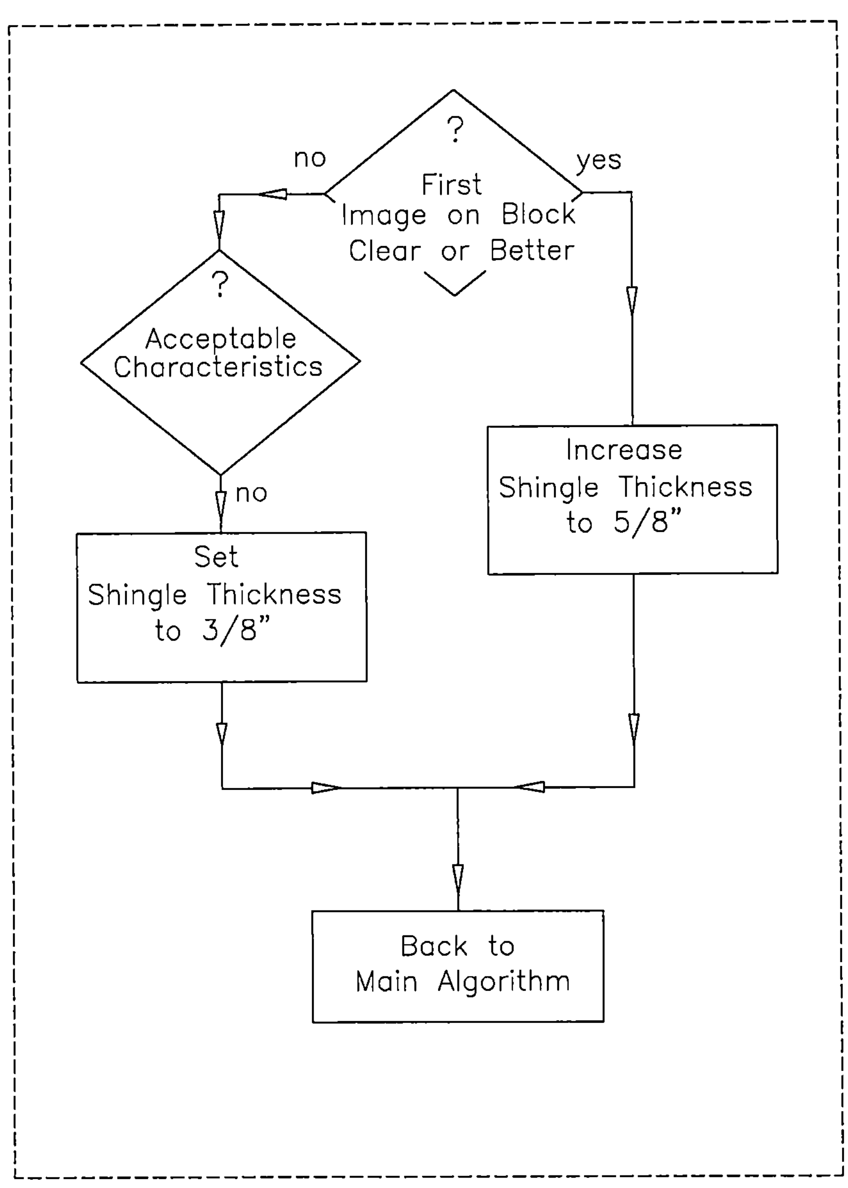
FIG. 8 illustrates a flow diagram of a second algorithm subroutine for increasing shingle thickness on high grade shingles.

Thicker shingles sell for a higher price than thinner shingles. Thicker shingles produce less waste in sawdust than the thinner version, by generating fewer saw cuts. Therefore, there is an advantage of producing thicker shingle as often as possible to increase recovery and profitability. For this purpose, Subroutine 2 illustrated in FIG. 8 has been prepared and incorporated into the main algorithm.

When a first image on a new cedar block shows a Clear or Better shingle, the probability is that this block contains few defects. The thickness of the first and subsequent shingles in that block is set to ⅝". The quality of every shingle is still monitored. As soon as a Grade C or Grade D shingle is found, the thickness of that inferior quality shingle is reduced to ⅜".

Clear-Below-the-Clear-Line

Referring back to FIG. 7, the machine vision system is based on a "clear-below-the-clear-line" approach. The machine vision system is asked a "0" or "1" question for a "0" or "1" answer. The question is: "is there at least one defect below the clear line?" In a first iteration, a "no" answer yields a "CLEAR or BETTER" grade, and a "yes" answer yields a call for inversion. In a second iteration a "no" answer yields a "CLEAR or BETTER" grade a "yes" answer calls for a shingle for the "Utility" bin. As mentioned before, the second clear are sorted out by default from the utility bin.

This "clear-below-the-clear-line" approach has resulted in the reduction of significant waste of raw material. This approach has resulted in an almost complete elimination of the removal cull strips from shingles. Although the step of removing of a cull strip to recover a CLEAR or BETTER shingle remains an option, this practice has been reduced significantly from the clear-below-the-clear-line and optimization-by-inversion approaches mentioned herein.

The new machine vision analysis is reduced to a single classification using black and white defects only. As a result, and surprisingly, shingle recovery has improved to the point of doubling the revenue from the raw material used, relative to the traditional shingle sawing.

Defects Discrimination Algorithm (the Main Algorithm)

Although great improvement has been done and described above, it is believed that reliable classification of shingles by machine vision is only possible with a machine vision system that can make abstraction of "false defects".

A scanning process has been developed to address false defects such as natural colourations and flying objects. This analytic process uses two artificial intelligence neural networks, for increasing the accuracy of defect detection; for eliminating false defects; for building a robust database of images of confirmed defects, and for skipping the scanning step as often as possible.

Figures 9A, 9B:
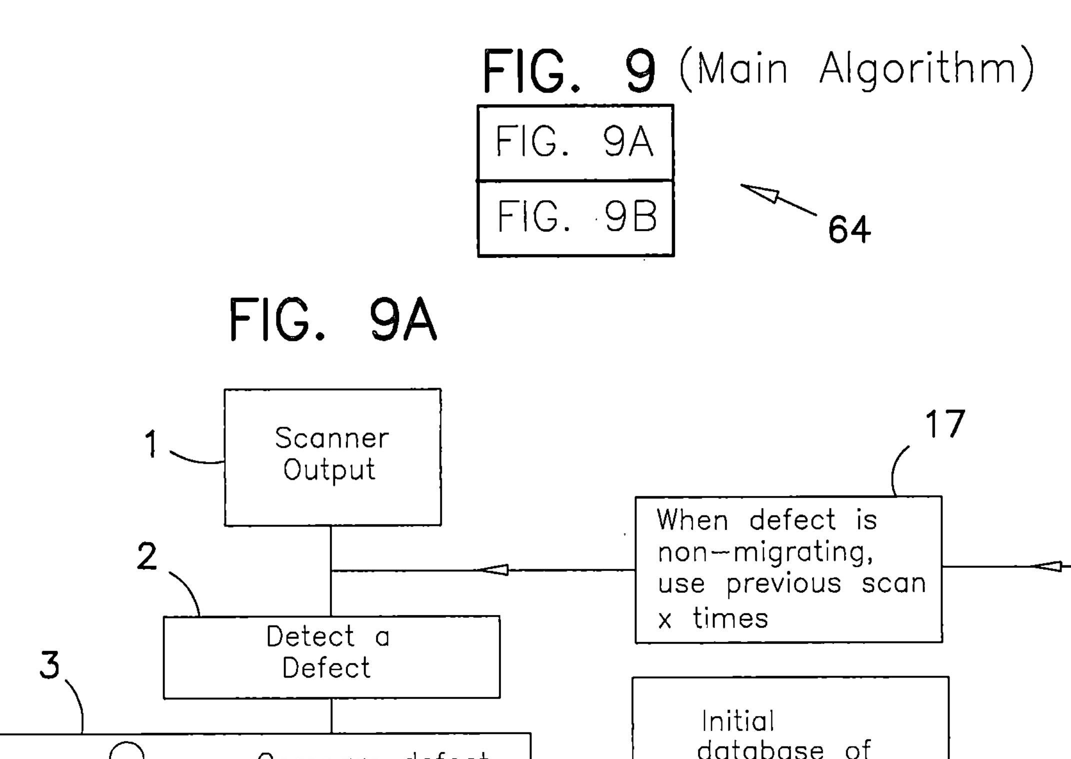
FIGS. 9A and 9B is a process flow diagram of a main algorithm used in the preferred embodiment of the present invention.

This defect discrimination algorithm 64 is illustrated in FIGS. 9A and 9B, and described as follows:

Step 1: Reference is firstly made to label 1 in FIG. 9A. A scanner is used to obtain an image of a slab in a cedar block prior to sawing one or more shingles out of this slab in one pass into the large saw. The scanner output uses modern cameras to provide a digitized image that can be analysed by pixels and by colour of each pixel. It is known that modern browsers supporting the full spectrum of 24-bit colours offer up to 16,777,216 different colour possibilities. Such technologies are used in the present scanner output.

(Note 1): The expression 'next cut' or 'next saw cut' used herein refers to one pass into the main larger saw of the "new shingle machine".

Step 2: The image is analysed to detect a defect. Defects are detected as contrasts in colour. A tolerance variable is introduced in that step to allow for shades and tints of natural wood.

Steps 3 and 4: when a defect is detected, that defect is classified accordingly, as a knot, a blob of resin, a crack, a patch of sapwood, for examples. The defect is compared to similar confirmed defects in a database of images of confirmed defects. Initially, the database contains 800,000 images of confirmed defects. The confirmed defects in the database have been entered partly manually and partly automatically from the confirmed defects found during past operation of the "new shingle machine". The analysis is done by comparing pixels of an image of a defects to pixels of images in the database and finding an array of matching pixels on the image of the defect and on at least one of the images in the database, wherein the array contains a percentage of matching pixels in the image. A percentage of 75% is used herein as an example.

(Note 2): The diagrams of circles and arrows in Steps 3 and 12, represent symbols for neural networks in an Artificial Intelligence System.

Human Subjectivity Port

Figure 9B:
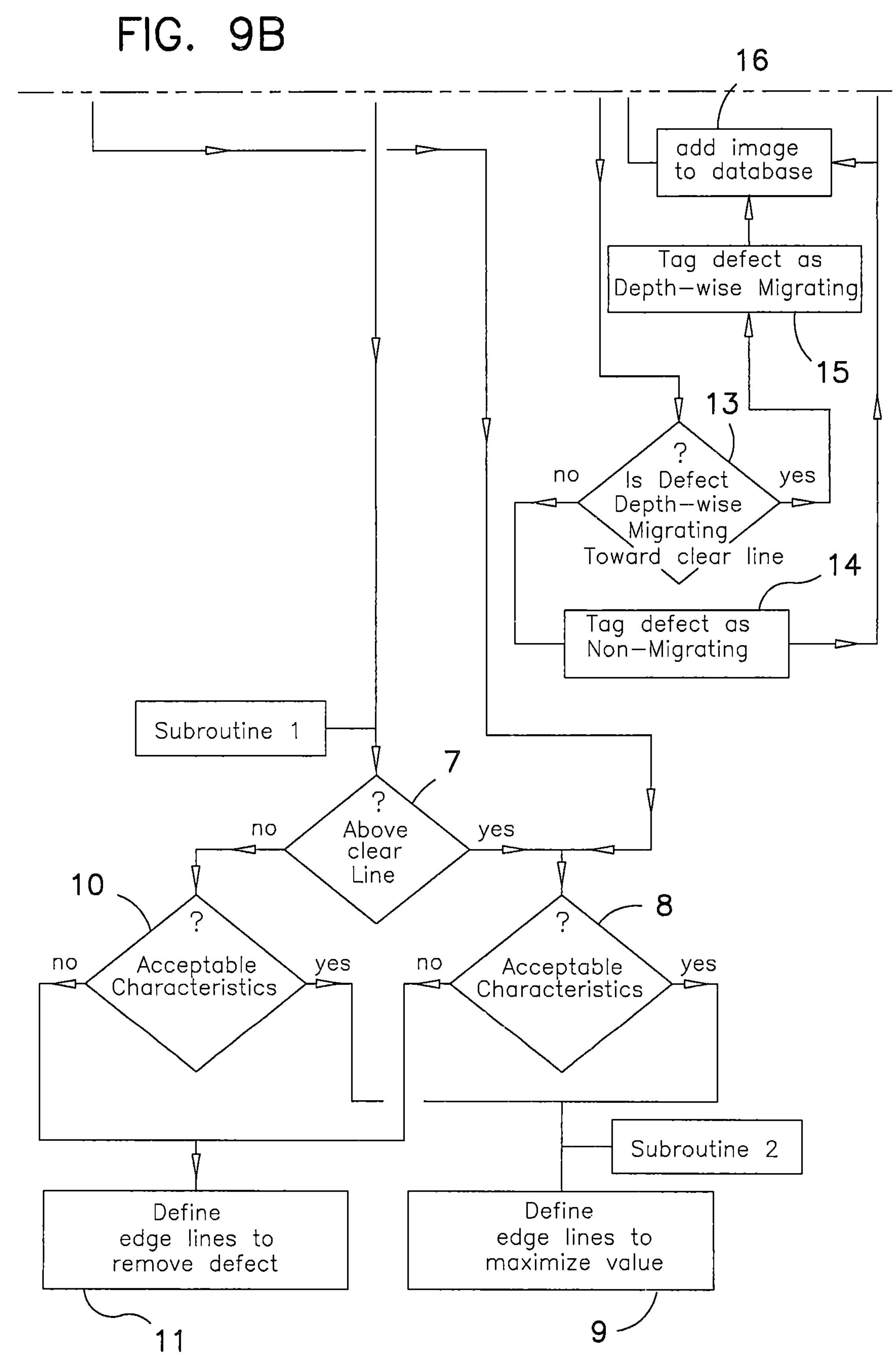

One of the additional layers to the present flow chart in FIG. 9, as mentioned before, is related to Step 3 and 4. The additional layer is referred to herein as a human subjectivity port. This port consists in a display screen (not shown); a keyboard (not shown); algorithm system, software and a computer port allowing connection of this layer to the main algorithm 64. This human subjectivity port allows a human manipulation of the images of confirmed defect images in the database. This human-subjectivity port is referenced as Step 5 in the main algorithm 64. The images of confirmed defects in the database are filed chronologically or by traceable batches for example. It is possible to manually scroll through the images in the database, and manually change the tag or the classification of any images, or to remove or to add images, whenever an inconsistency is found during the final manual inspection of shingles, during packaging for example.

The management of the database by personnel at an inspection or packaging station, introduces human logic and subjectivity in the database. As mentioned before, the initial database of images of confirmed defects contained an inventory of 800,000 images. Most of these images were verified, confirmed and entered by experienced shingle sawyers. New images are managed by an artificial intelligence network, based on similarity with the initial inventory, as shown in Steps 3 and 4 of the main algorithm 64. It will be appreciated that the artificial intelligence system has been trained and is continually training on images that contain the subjectivity of experienced shingle sawyers. The new layer mentioned above, in Step 5, provides a further degree of confirmation of new images added to the database, by experienced shingle sawyers. For these reasons, it is believed that the decision-making ability of the preferred algorithm 64 has a high degree of equivalence to the skills of a human shingle sawyer. It is believed that the decision making ability of the main algorithm 64 is done using a combination of human subjectivity and artificial intelligence.

Because of the artificial intelligence network, and the human-subjectivity approach, the precision of the algorithm 64 of defect discrimination improves continually, by a process that is well know in the field of artificial intelligence.

Step 6: In association with Steps 3 and 4 of comparing a defect with the image database, this step provides a variable, shown now as 75%, to adjust the precision with which defects are classified as real defects or false defects.

Although 75% is shown, any other number can be used. In this example, when 75% of the pixels in an array of a scanned image match a similar array on an image in the database of confirmed defects, the scanned defect is treated as a real defect. A matching scanned image is eventually added to the database of confirmed defects.

If a scan does not match a confirmed defect to the precision requested, this scanned defect is treated as a false defect, and the image is considered to be a clear shingle. False defects are not added to the database.

Examples of false defects is a colour spot or distinctive mark due to a hammer blow, or similar shock for example, done to a young or juvenile tree, and which mark remained embedded in the age-rings of the tree. Other examples of false defects are natural colourations, and flying objects as mentioned before.

Step 7: When a real defect is found, the query process proceeds to examine whether or not this defect is above or below the clear line on the shingle to be sawn.

Step 8: When the defect is above the clear line, the query process verifies whether or not the defect is an acceptable one for one classification or another.

Step 9: When all the grade characteristics are found to be allowable, the edge lines of the shingles to be sawn from the slab of the next cut are defined to maximize the value of these shingles.

Step 10: When a defect is found below the clear line in Step 7, the scan is examined to determined if the defect consists of an acceptable characteristic. Again, the edge lines are defined to maximize the value of that lower grade.

Step 11: If a defect is not acceptable for a Clear or Better or utility, the edge lines of the shingles to be sawn from the slab of the next cut are defined to remove the defect.

Migrating Defects

Step 12: As mentioned above, when a scanned defect matches an image of confirmed defect to a precision of 75% or better, for example, that scanned image is added to the database of images of confirmed defects. However, before doing so, another analysis is effected. This next analysis is to determined whether the defect found extends depth-wise in a perpendicular direction relative to the surface of the wood slab in the present scan, or migrates obliquely up or down or to one side or the other. For example, a knot may be found to be clear above the clear line on the front face of a shingle, but may migrate below the clear line on the shingle underneath.

Figure 10:
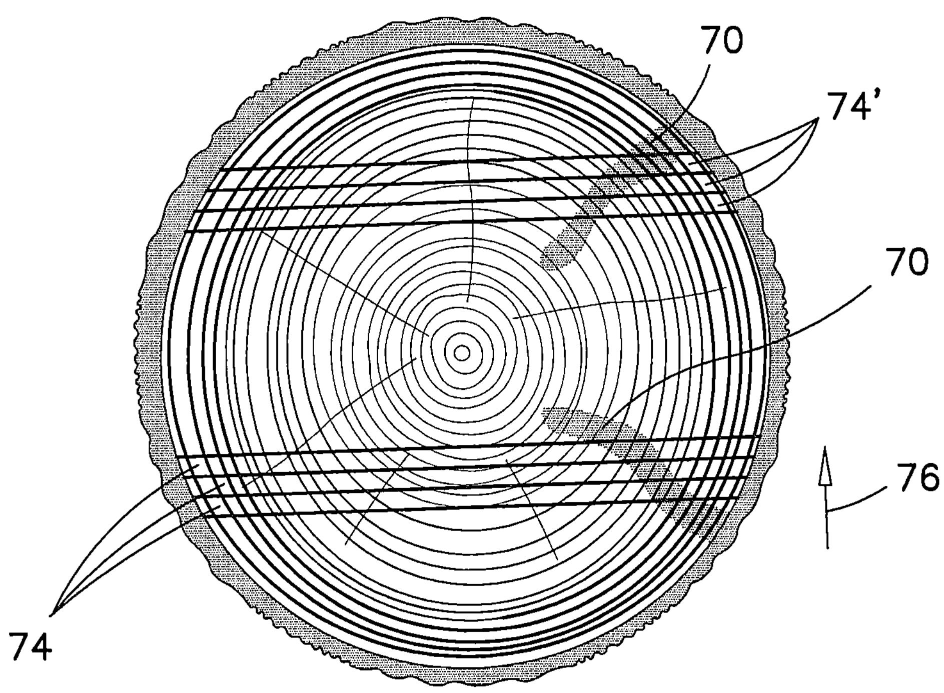
FIG. 10 is a top view of a wood block showing typical branch roots in that block.

Referring now to FIG. 10, the radial discolourations 70 on the wood block 72 in this drawing represent roots of branches. When shingles 74 are sawn in the direction of arrow 76 for example, this defect migrates inwardly from one shingle to the next on shingles 74 taken on the near side of the block. This type of defect migrates outwardly from one shingle to the next on shingles 74' taken on the far side of the block.

This depth-wise analysis is effected by an algorithm combined with a second neural network such as to continually increase prediction accuracy. This depth-wise analysis is effected by comparing the present scan to the previous scan and analysing the relative positions of all the defects found on both scanned images. This analysis determines the direction of migration of the defects that are common to both scans.

Step 13: Once the direction of migration is defined in the above step, a determination is made to find whether or not one or more defects migrates toward the clear line or the edge lines on the shingles to be sawn on the next saw cut.

Step 14: When the defect found extends perpendicular to the surface of the scanned slab, this or these defects are tagged as "non-migrating".

Step 15: When at least one of the defects found do migrate depth-wise toward the clear line or the edge lines, this or these defects are tagged as "depth-wise migrating".

Step 16: Whether a defect is migrating or not, these defects are added to the database of confirmed defects with their respective tags.

Step 17: When all the defects found on a scan are not migrating; in other words, when all the defects found are extending perpendicular to the surface of the slab, the next scan is assumed to be very similar to the present scan being studied.

Therefore, there is no need to scan the wood block 26 again for the next saw cut. Because there is a very strong possibility that the next scan will be a same image as the one just studied, there is an advantage of using a scan several times, and saving production time by eliminating re-scan time. It is estimated that scanning wood blocks at every second saw cut for example, can increase production output by 30%.

Double-Cut Mode

Figure 11:
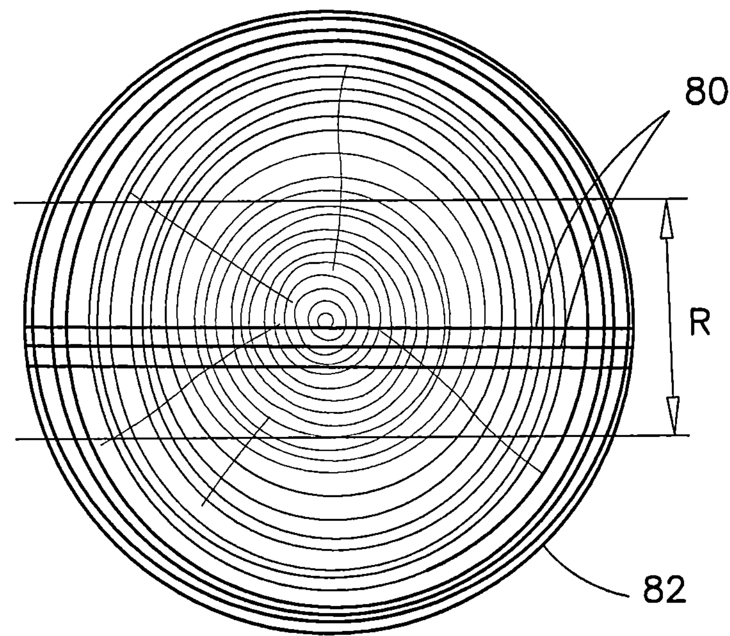
FIG. 11 illustrates another top view of a wood block showing shingle width variations near the centre of the block.

Reference is now made to FIG. 11, to describe another method to increase production output. It will be appreciated from this diagram that the widths of slabs 80 taken in the central region "R" of a wood block 82 are almost identical, and the shingles taken from these have identical commercial value. Therefore, when a "skip-a-scan" slab has been found, a comparison of the width of that slab with the previous one is used to determine whether these slabs are taken from a central region "R" of a block. If the width of one slab is an approximation of the width of an adjacent slab, a "double-cut mode" is initiated. In a "double-cut mode", the edging lines of the next shingle are cut deeper, to a thickness of two shingles. The carriage is move toward the main saw to cut the top shingle(s); the block is moved backward just enough to clear the main saw, and forward again to cut the bottom shingles(s). This double cut is effected without moving the slab to the scanning or to the edging stations. This shorter block displacement represents the saving in production time. A soon as the width of two superimposed slabs exceed a defined value, (one-half inch for example) the sawing returns to a single pass mode.

In a double-cut mode, a comparison is first made between the width of a first and second contiguous slabs, and then the comparison is made between the second and fourth adjacent slabs, and fourth and sixth adjacent slabs, and so on.

Single-Pass Edging Mode

In a double-cut mode, the edging of both superimposed shingle(s) is effected in a single-pass edging mode, as mentioned above. This single pass edging is effected by edging a slab at a depth of two shingles, with the tip of the edging saw protruding precisely in the kerf of the next cut to be made by the main saw. The edging is effected without scribing or otherwise marking the surface of the next slab exposed by the kerf. This single-pass edging is effected with a same precision, whether the machine is using an optimization-by-inversion mode; two thick ends on top or bottom, alternated thick end position, or with varying thickness shingles.

As mentioned herein before, one or more layers can be added to this flow chart of FIG. 9. In another example of an additional layer, using the "human subjectivity port", any employee doing visual inspection of the finished product, can go back into the database of images when an error is found, and scroll back to verify the classification of a defect associated with a finish product. That person can also manually remove a false defect from the database.

In relations to layers, the subroutine 1 can be attached to the main algorithm in a separate layer and executed in parallel, in series or in other association with step 7 in the main algorithm, and subroutine 2 can be attached and executed in a same way with step 9, as suggested in FIG. 9B.

Figures 15, 16:
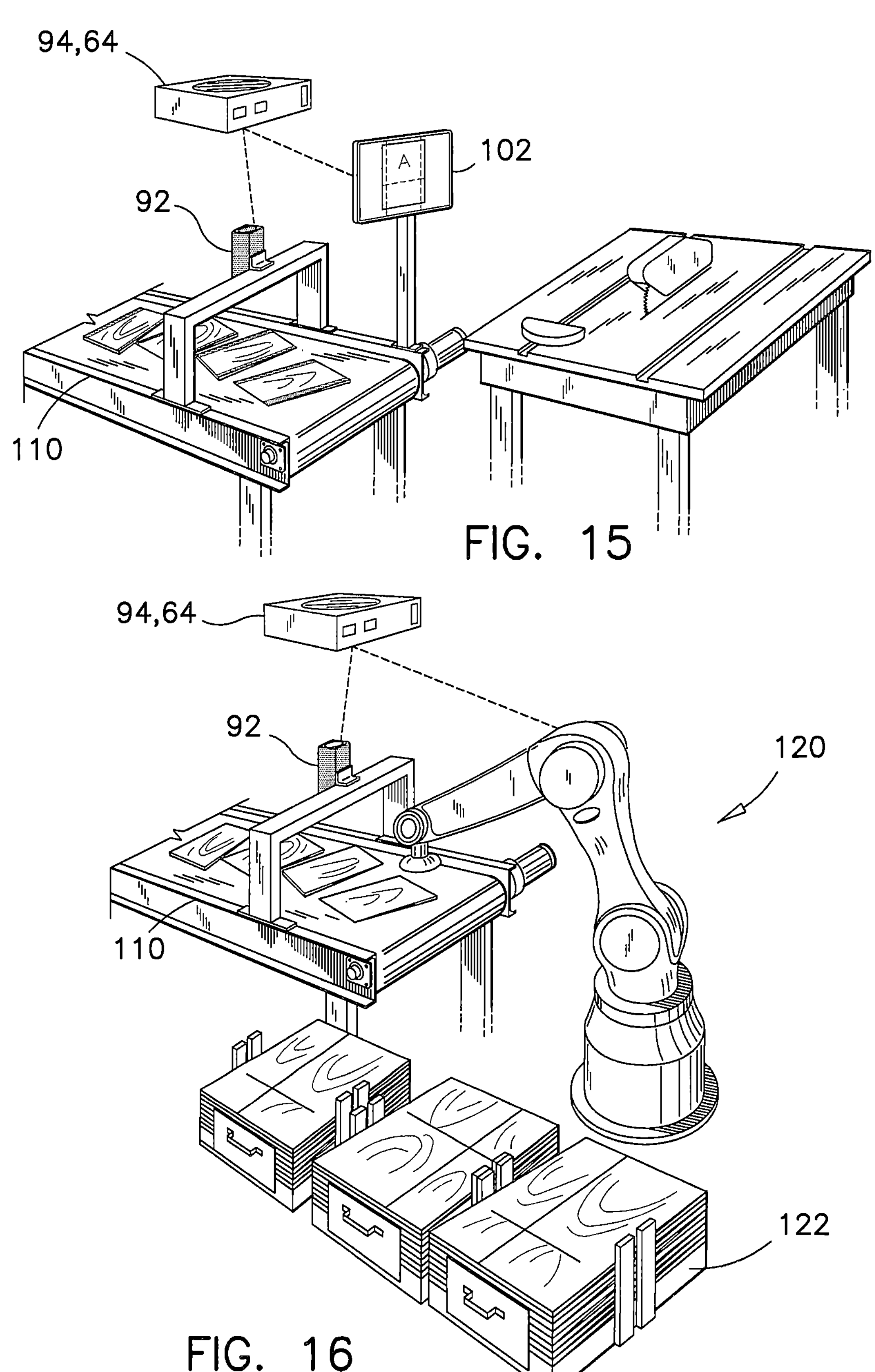
FIG. 15 is a perspective view of a manual shingle edging installation, showing a third potential use of the machine vision system according to the preferred embodiment of the preferred invention.
FIG. 16 is a perspective view of a robotic shingle packaging installation, showing a fourth potential use of the machine vision system according to the preferred embodiment of the present invention.
Figure 17:
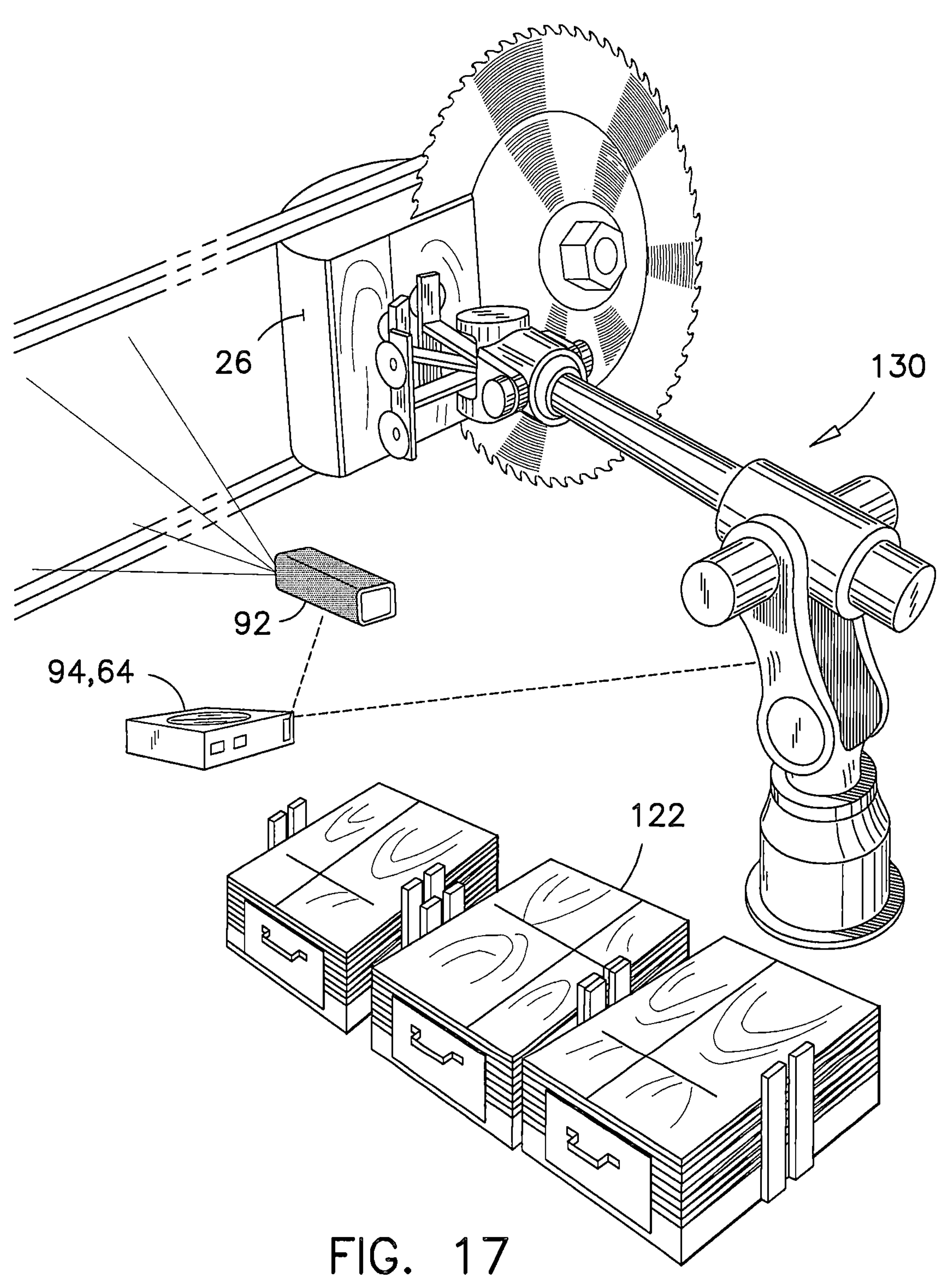
FIG. 17 is another perspective view of a robotic installation using the machine vision system according to the preferred embodiment of the present invention.

Additionally, another layer to this flow chart will integrate the system according to the present invention to an additional system being designed for packaging shingles using robotics and machine vision, such as illustrated in FIGS. 16-17, for examples. The addition of that new layer will ensure that the grade selection and width of shingles produced using the system according to the present invention are memorized and shared between production and packaging, and a final inspection at packaging can be used to validate, modify, add or subtract from the database in step 4.

Elements of the Machine Vision System

Figure 12:
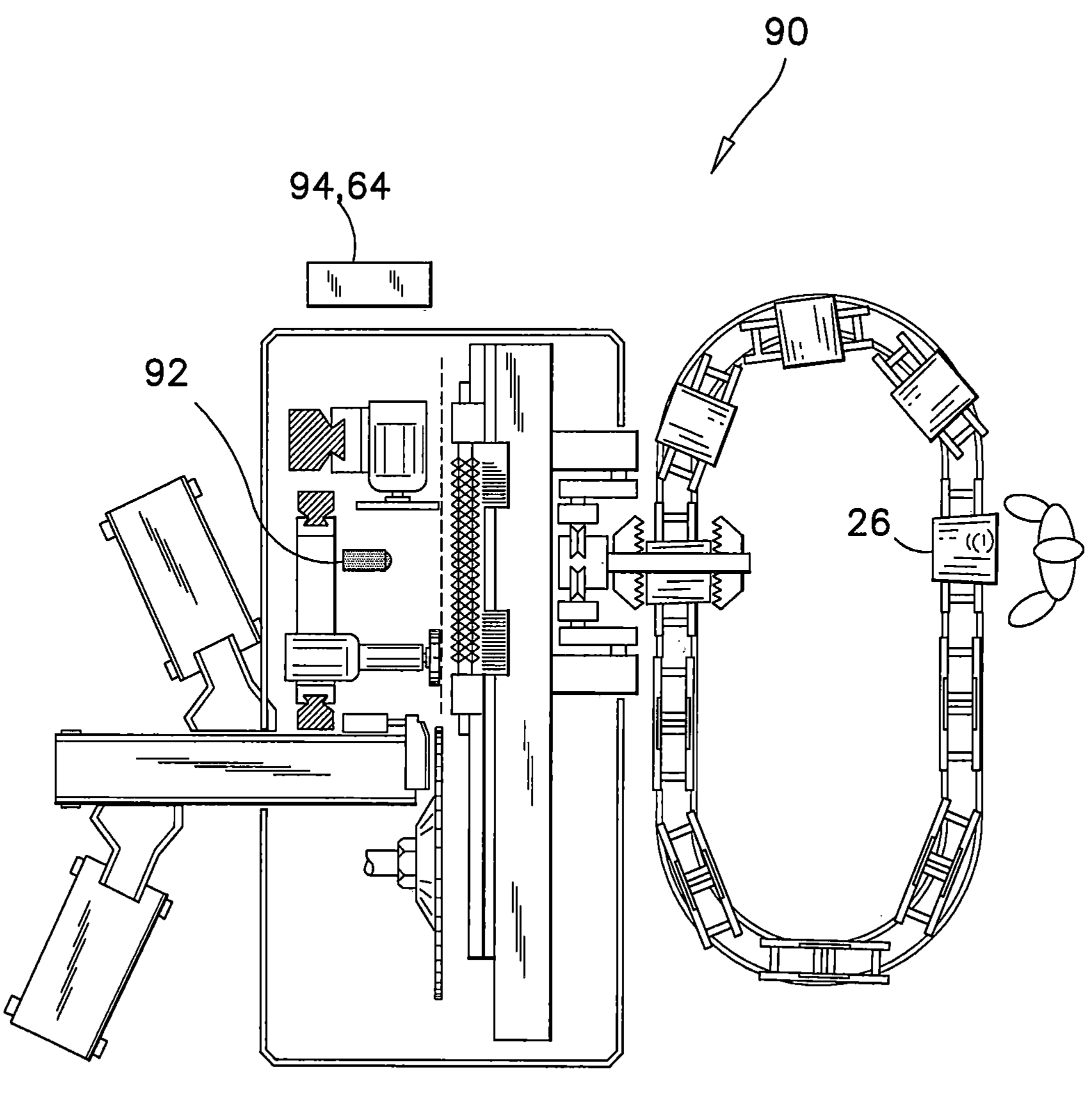
FIG. 12 is a plan view of the "new shingle machine" in which the preferred machine vision system has been developed.

It is believed that the machine vision system according to the preferred embodiment of the present invention can now be used reliably on many applications related to shingle manufacturing. Referring firstly to the "new shingle machine" 90 shown in FIG. 12, the preferred machine vision system comprises a camera 92, a computer 94 storing and working a database of images of confirmed defects and a defect discrimination algorithm 64, incorporated in the computer.

Figure 13:
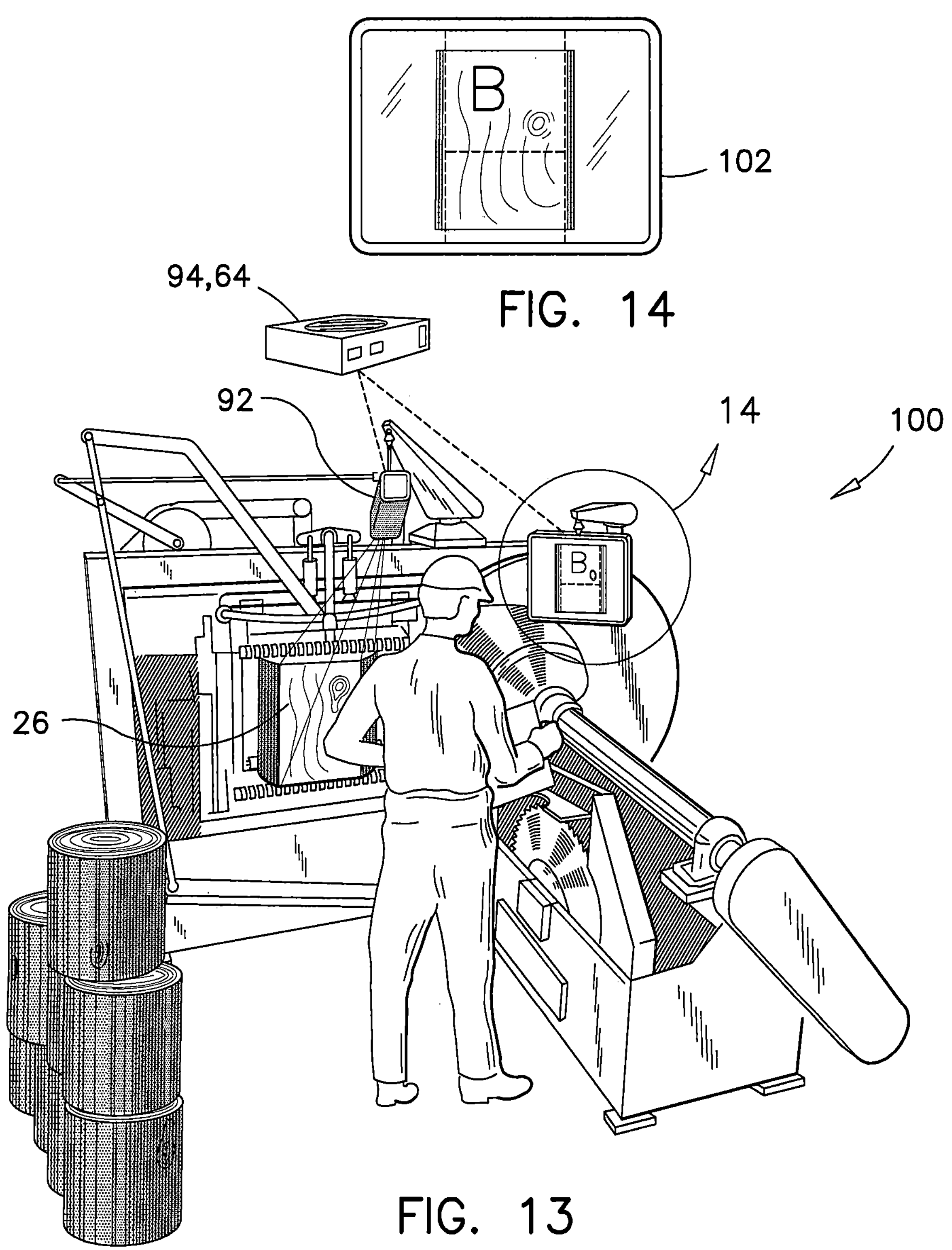
FIG. 13 is a perspective view of a conventional shingle sawing installation showing a second potential application of the machine vision system according to the preferred embodiment of the present invention.

It is believed that the preferred machine vision system 92, 94, 64 can also be used on a conventional shingle sawing machine 100 as shown in FIG. 13, to instruct the sawyer on a display screen 102, in FIG. 14, of the suggested grade and edging lines of the shingle just sawn.

When the edging of shingles is done on a separate work station, the machine vision system 92, 94, 64 can also be installed on a conveyor 110, as shown in FIG. 15 and instruct a table-saw operator on a display screen 102 of the suggested edging lines and grade of the next shingle coming on the conveyor 110.

Similarly, the preferred machine vision system 92, 94, 64 can also be used to control a robotic shingle packaging machine 120 to pick shingles from a conveyor 110 and to place these shingles in appropriate classification boxes 122 for packaging, as illustrated in FIG. 16.

Furthermore, the preferred machine vision system 92, 94, 64 can also be used to control a robotic shingle picking and manipulating machine 130 to pick shingles against the main saw while being cut and to place these shingles in classification boxes 122 as schematically illustrated in FIG. 17.

In summary, the method for classification of shingles by machine vision comprises the following steps:

- Eliminating machine defects; cedar block imperfections; and sapwood;
- Analysing a surface of a wood block using a "One-Line-One-Window" approach;
- Sorting the Second Clear shingles by default;
- Considering "Black and White" defects only;
- Reducing the number of classifications to "Clear or Better" and "Utility";
- Using a "clear-below-the-line" approach to classification;
- Using an "Optimization-by-Inversion" approach to classification;
- Using a "Skip-a-Scan" approach to scanning;
- Using an "Adjust-Shingle-Thickness" approach to maximize value;
- Using a "Skip-a-Scan" event to revert to a "Double-Cut mode";
- Using a precise Single-Pass Edging mode to allow a Double-Cut mode;
- Building a robust database of images of confirmed defects;
- Using a human subjectivity approach to database management;
- Making abstraction of any defect not matching a confirmed defect, and
- Using Artificial Intelligence for continuing improvement of database management and defect discrimination.

The classification of shingle by machine vision according to the preferred embodiment has been used with great success. It also has been found that because of continuous improvement, some of the requirements mentioned above can be relaxed by a substantial extent. For example, the word "eliminating" relative to remediable defects, can be changed to "reducing" while the preferred classification by machine vision still performs with acceptable commercial results. Also, the initial black and white defects approach can be upgraded to coloured defects, and more than two grades can be considered.

While one embodiment of the machine vision system according to the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. A method of wood shingle classification by machine vision and shingle packaging, the method comprising the steps of:

taking an image of a wood shingle and determining a clear line on said wood shingle;

identifying a single defect in said image;

when said single defect is above said clear line:
classifying said wood shingle as a Clear-or-Better grade combining Grade A and Grade B together; and
packaging said wood shingle;
when said single defect is below said clear line:
classifying said wood shingle as a Utility grade combining Grade C and Grade D together; and
packaging said wood shingle.

* * * * *